Sept. 12, 1950 J. K. DE ARMOND 2,521,696

OPTIMUM FREQUENCY RADIO COMMUNICATION SYSTEM

Filed Jan. 24, 1949 4 Sheets-Sheet 1

INVENTOR.
JAMES K. DEARMOND
BY Wade Koontz
ATTORNEY and
James S. Shannon
AGENT

Sept. 12, 1950 J. K. DE ARMOND 2,521,696

OPTIMUM FREQUENCY RADIO COMMUNICATION SYSTEM

Filed Jan. 24, 1949 4 Sheets-Sheet 2

INVENTOR.
JAMES K. DEARMOND
BY Wade Koontz
ATTORNEY and
James S. Shannon
AGENT

Sept. 12, 1950 J. K. DE ARMOND 2,521,696

OPTIMUM FREQUENCY RADIO COMMUNICATION SYSTEM

Filed Jan. 24, 1949 4 Sheets-Sheet 3

INVENTOR.
JAMES K. DEARMOND
BY Wade Koontz
ATTORNEY and
James S. Shannon
AGENT

Sept. 12, 1950 J. K. DE ARMOND 2,521,696

OPTIMUM FREQUENCY RADIO COMMUNICATION SYSTEM

Filed Jan. 24, 1949 4 Sheets-Sheet 4

INVENTOR.
JAMES K. DE ARMOND
BY Wade Koontz
ATTORNEY and
James S. Shannon
AGENT

Patented Sept. 12, 1950 2,521,696

UNITED STATES PATENT OFFICE 2,521,696

OPTIMUM FREQUENCY RADIO COMMUNICATION SYSTEM

James K. De Armond, Arlington, Va.

Application January 24, 1949, Serial No. 72,468

7 Claims. (Cl. 250—6)

(Granted under the act of March 3, 1883, as amended April 30, 1928; 370 O. G. 757)

The invention described herein may be manufactured and used by or for the Government for governmental purposes without payment to me of any royalty thereon.

This invention relates to radio communication systems and particularly to a system in which means are provided for automatically selecting an optimum transmission frequency.

It is accordingly the object of this invention to provide means in connection with a radio communication system for automatically selecting the optimum frequency from a plurality of predetermined frequencies.

At the present state of the art it is impossible to predict accurately what the optimum frequency will be at any given time for communication between two radio stations. Therefore determination of the optimum frequency can only be done by periodic sampling of the ionospheric reflections to the radio station with which it is desired to communicate. The exact frequency could be determined precisely only by means of panoramic transmission through the band without hiatus; however this would cause undesirable interference with other services. By a judicious selection of spot frequencies for transmission the optimum frequency can be determined with sufficient precision to greatly improve the operating efficiency of the communication system. In accordance with the invention this is accomplished by successive short transmissions on predetermined frequencies and by a comparison of these transmissions to determine which is the best of the frequencies tested. Communication between the two stations is then effected on the optimum frequency, preferably by means of high speed transmission from tape recorders or the like in order to complete the transmission before ionospheric changes can take place.

The invention employs the following basic steps in accomplishing the above:

(*a*) The master station transmits on selected spot frequencies in a band of frequencies in which the optimum frequency is known to exist, based on ionosphere propagation tables for the time of year and day and the period of the sun spot cycle. The signals are coded with the code identifying the particularly cooperating station with which the master station wishes to communicate. There will be an identifying code for each station with which the master station would be communicating from time to time.

(*b*) The cooperating stations are equipped with a standby receiver on each of the predetermined spot frequencies. The output of these receivers is fed through a station code selector into an automatic signal strength analyzer in which a series of pulses is generated for each frequency, proportional in number to the strength of the signal received on that frequency. The series of pulses for each frequency is counted by a step counter for that frequency. When the signal strengths of all frequencies have been recorded on the counters the analyzer sweeps across the recorded signal strengths starting at the highest level and stepping down one step on each sweep until a contact is made indicating the frequency of the strongest signal. The analyzer, having determined the optimum frequency, automatically causes the transmitter at the cooperating station to transmit a continuous signal on that frequency of sufficient duration to allow a semi-panoramic receiver at the master station to act through a control circuit to lock itself and the transmitter at the master station on the optimum frequency.

(*c*) The master station then transmits to the cooperating station over the optimum frequency.

(*d*) As the completion of transmission from the master station, the cooperating station automatically transmits what traffic it may have for the master station.

The details of a practical embodiment of the invention will be explained in connection with the accompanying drawings in which.

Figure 2:
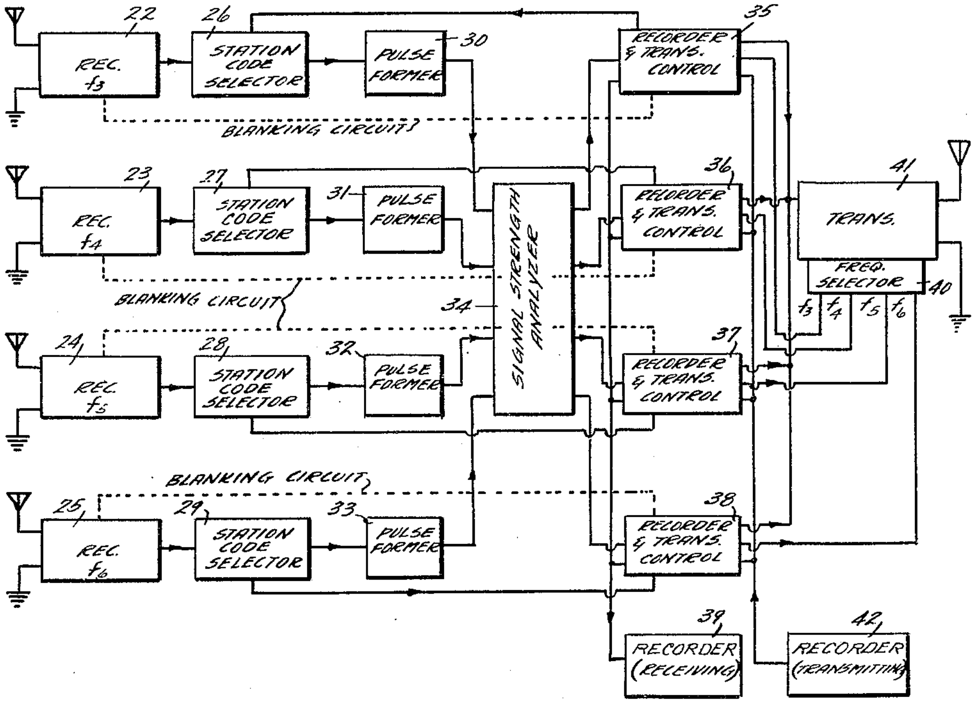
Fig. 2 is a block diagram of a cooperation station of the communicating system.
Figure 4A:
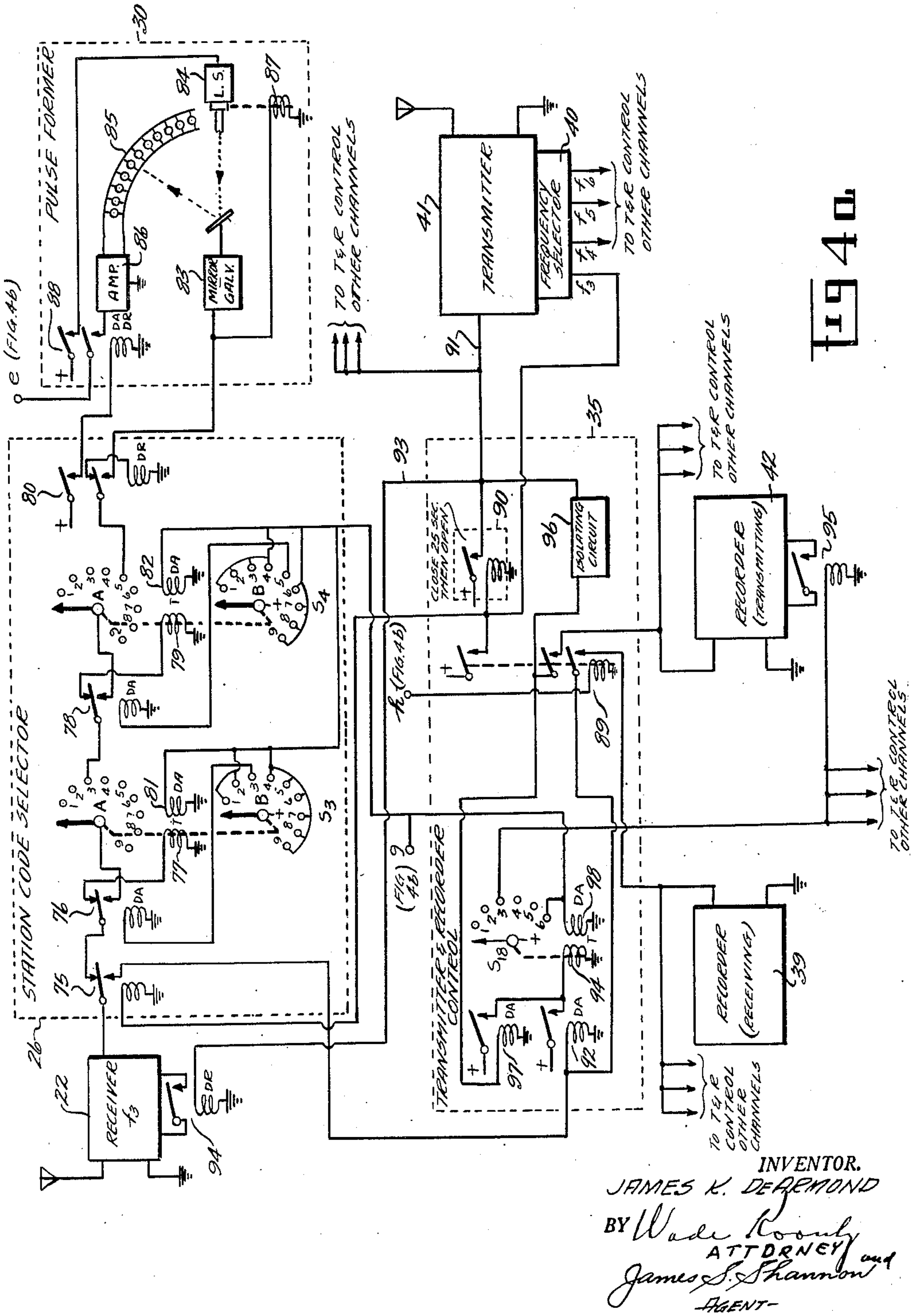
Figure 4B:
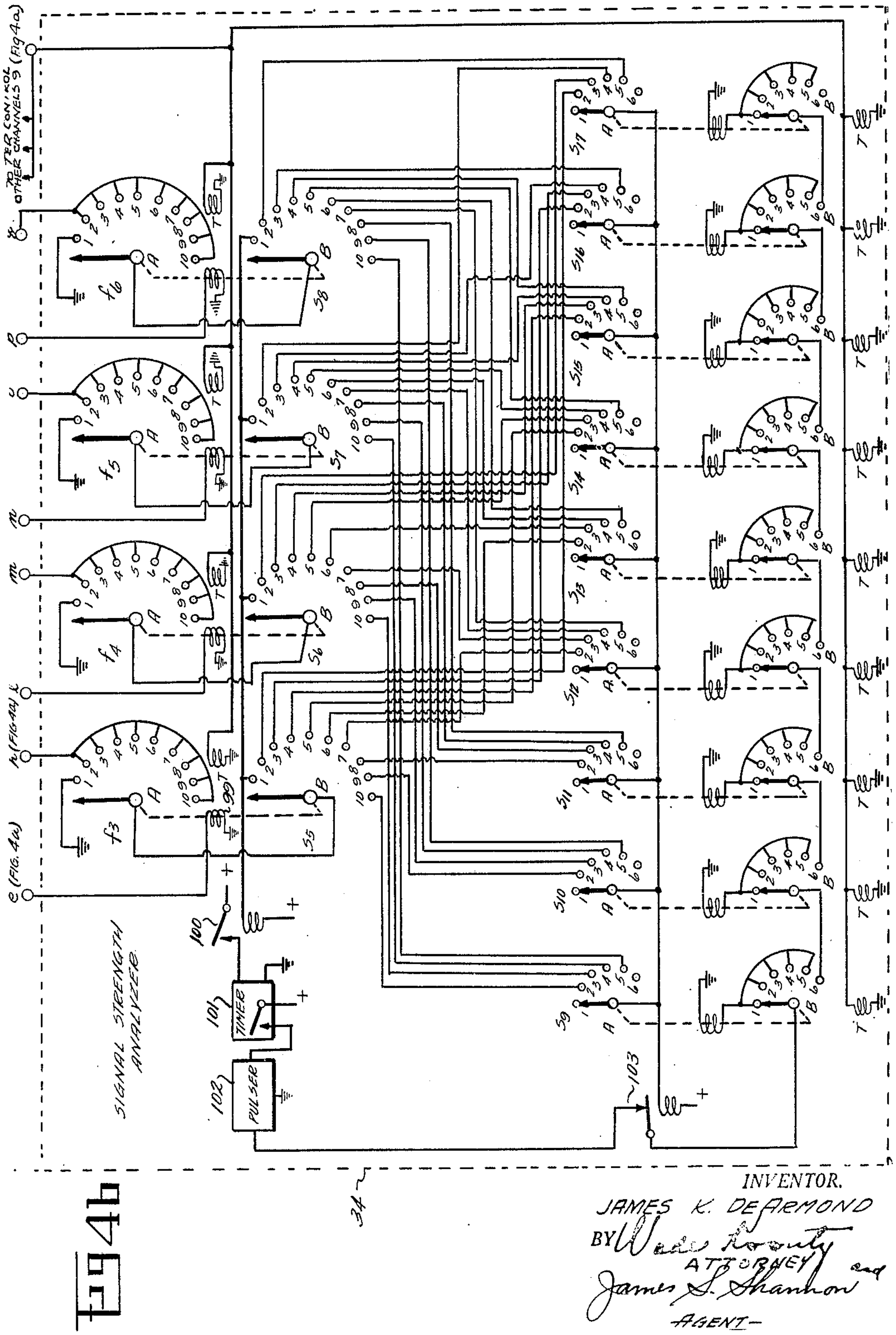

Figs. 4*a* and 4*b* give the schematic circuit diagrams of elements in Fig. 2.

Figure 1:
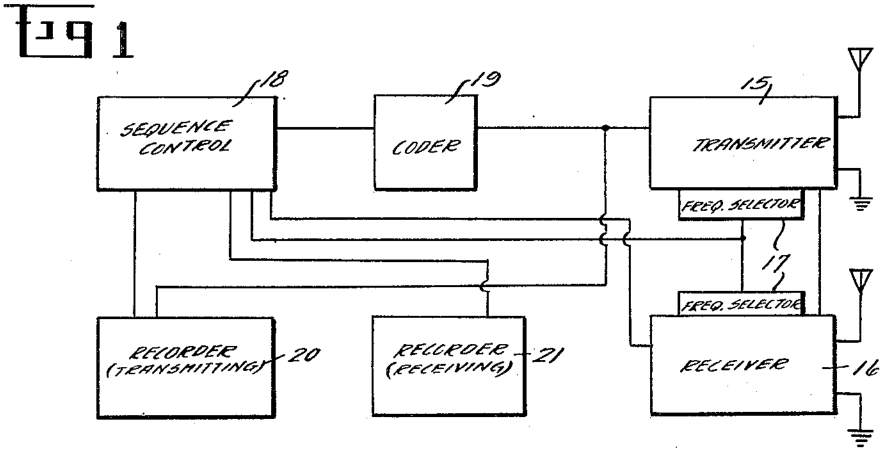
Fig. 1 is a block diagram of the controlling or master station of the communication system.

The controlling or master station shown in Fig. 1 comprises a transmitter 15 and a receiver 16 simultaneously tunable to any one of a number of different frequencies by means of frequency selectors 17. In order to initiate transmission between the master station and a cooperating station it is necessary to know the identification code of the station with which communication is desired and the frequencies on which the station is standing by. The code is set into the coder 19 and the various test frequencies, corresponding to the frequencies on which the cooperating station is standing by, are set into a frequency selector in the sequence control 18. The sequence control 18 then automatically tunes the transmitter through the frequency selector to each of the test frequencies and, while the transmitter is on each frequency, acts through coder 19 to cause the transmitter to radiate a signal consisting of a station identifying code followed by a short period of continuous signal of sufficient duration to permit evaluation thereof by the cooperating receiving station. Following transmission on all the test frequencies the sequence control continues to consecutively tune both transmitter and receiver through the frequency selector to the test frequencies with the coder 19 inoperative so that the transmitter is not keyed. During this period the cooperating station analyzes the test frequencies and then radiates a continuous signal on the optimum frequency back to the master station. As receiver 16 sweeps over the various test frequencies it will eventually be tuned to and receive the return transmission on the optimum frequency from the cooperating station. Upon reception of this signal the sequence control acts to lock transmitter and receiver on this frequency and to connect transmitting recorder 20 to transmitter 15 for high speed transmission of messages or other intelligence from the master station to the cooperating station. At the end of the transmission a special signal starts the receiving recorder to receive traffic from the cooperating station. At the conclusion of recording traffic from the cooperating station the sequence control automatically returns to its original or starting condition.

The block diagram of a station to cooperate with the above described master station is shown in Fig. 2. The station shown comprises four channels, and therefore can stand by on four test frequencies. A greater number of test frequencies may be accommodated by increasing the number of channels. Each of receivers 22 through 25 stands by on one of the four test frequencies, designated in this case $f_3$, $f_4$, $f_5$ and $f_6$, which must be known to the master station in order that test transmissions may be made on the proper frequencies. As already stated each test transmission is preceded by the identification code of the station with which communication is desired. In order to have each cooperating station respond only to signals intended therefor the receivers 22–25 are followed by station code selectors (26–29) which act, in the presence of the proper identifying code, to connect the receiver to one of the pulse formers 30–33. Each pulse former produces a series of equally spaced pulses proportional in number to the received amplitude of the short test transmission that follows the identifying code on each frequency, and applies these pulses to signal strength analyzer 34 where the number of pulses is recorded. After the number of pulses so produced has been recorded for each of frequencies $f_3$, $f_4$, $f_5$ and $f_6$, the analyzer determines for which channel the highest number of pulses was recorded and acts through the recorder and transmitter control for that channel to set transmitter 41 to the optimum frequency by means of frequency selector 40. The analyzer further acts through the receiver and transmitter control of the selected channel to initiate a short period of constant signal transmission on the optimum frequency, to permit the master station to adjust its transmitter and receiver to this frequency as explained on connection with Fig. 1, and to connect receiving recorder 39 to the receiver of that channel. Upon the termination of incoming traffic the recorder and transmitter control acts to disconnect the receiving recorder from the receiver and to connect the transmitting recorder 42 to the transmitter for the transmission of outgoing traffic on the optimum frequency. At the end of the outgoing traffic the recorder and transmitter control acts to return the station code selector of the channel in use and the signal strength analyzer to their original starting conditions. Blanking circuits shown in dotted lines may be employed between the recorder and transmitter controls and the receivers to render the receivers inoperative when the transmitter is keyed.

Figure 3:
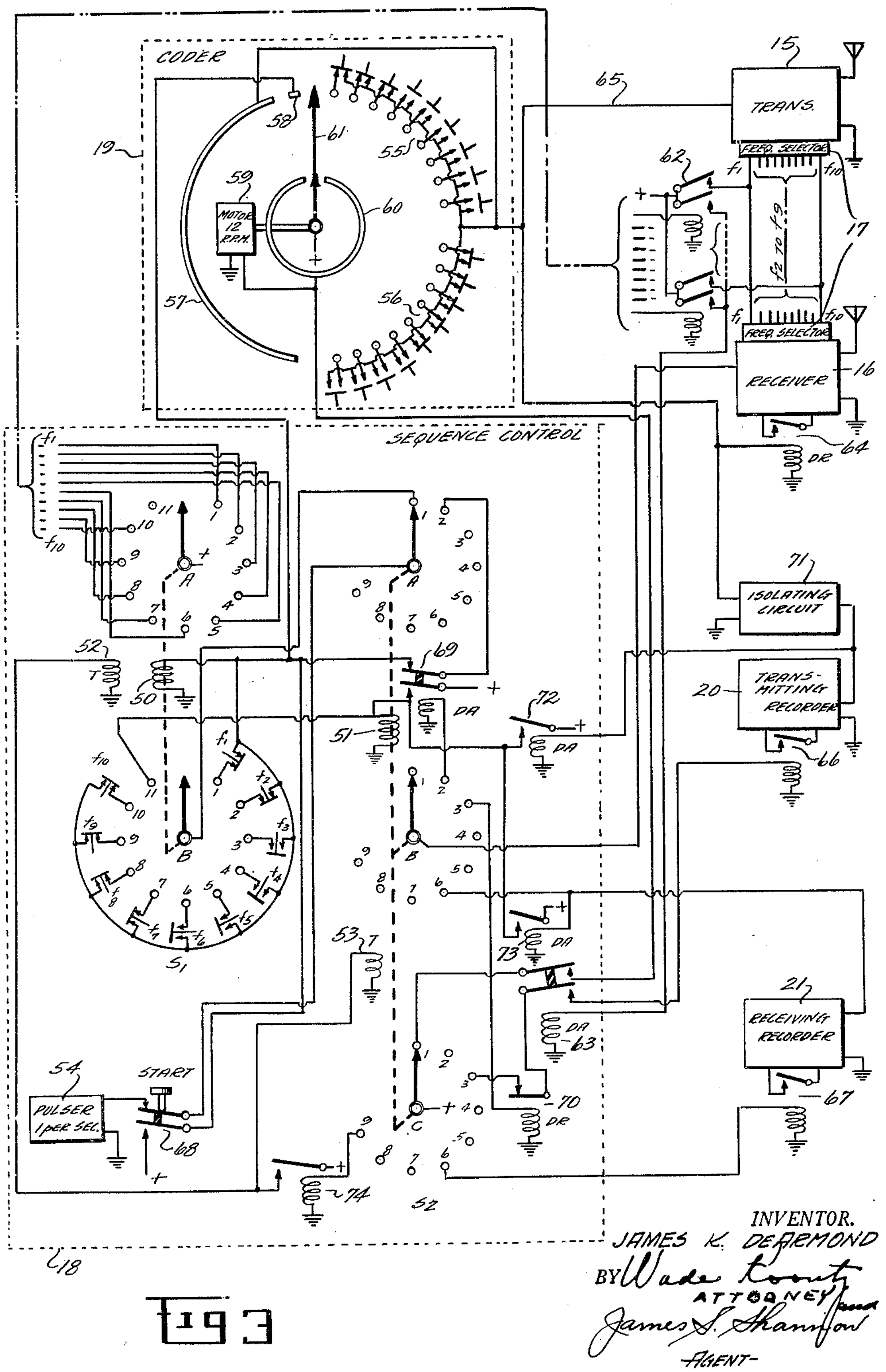
Fig. 3 is a schematic circuit diagram of Fig. 1.

The various elements shown in block form in Figs. 1 and 2 may be of any specific design capable of performing the functions assigned above. Figs. 3, 4*a* and 4*b* show the details of suitable embodiments of these elements. Referring to Fig. 3, which shows the details of the elements shown in block form in Fig. 1, the sequence control 18 comprises a stepping switch $S_1$ having two banks of contacts A and B and a second stepping switch $S_2$ having three banks of contacts A, B and C. The revolving contacts in switch $S_1$ are moved one step in unison for each pulse of voltage applied to stepping coil 50. Similarly the revolving contacts of switch $S_2$ are moved one step in unison for each pulse of voltage applied to stepping coil 51. Trip coils 52 and 53, each designated T, are provided for returning the switches $S_1$ and $S_2$ to their starting positions. Each contact of bank B of switch $S_1$ has connected in series therewith a push-button switch of the type that remains open after being depressed. Each of these switches represents a frequency to which the transmitter and receiver may be tuned. Bank A of this switch is used to change the transmitter and receiver frequency as will be explained later. A pulser 54 is provided, which produces voltage pulses at a constant rate, for example, one per second, to operate switches $S_1$ and $S_2$. The sequency control further contains a number of relays which cooperate with switches $S_1$ and $S_2$ in a manner which will be explained later in discussing the operation of the master station.

Coder 19 consists of a rotating switch having around its periphery two series of equally spaced contacts 55 and 56, a continuous strip contact 57 and an additional contact 58. The revolving contact of this switch is driven by a motor 59 at a speed of 12 revolutions per minute, so that the contact makes one revolution in five seconds. The revolving contact therefore requires about one second to pass over the series of contacts 55, one second to pass over the series 56, about two seconds to pass over the contact 57 and the remaining one second in passing over contact 58 and the blank spaces. A conducting ring 60 is also provided which contacts the revolving contact 61 in all positions except a short distance on either side of its starting position. Each of the contacts in the series 55 and 56 has connected in series therewith a push-button switch of the type that when pushed remains closed.

The frequency selector 17 is associated with transmitter 15 and receiver 16 and operates upon the application of a positive voltage to the proper circuit thereof to set both transmitter and receiver to one of a number of frequencies, in this case ten. These circuits are indicated by the ten connections numbered $f_1$ through $f_{10}$. The specific details of the frequency selector are unimportant and are not shown. Ten double-pole relays, all identical to relay 62, are provided for applying positive voltage through their upper contacts to one of the circuits $f_1$ through $f_{10}$, the relays for $f_1$ and $f_{10}$ only being shown. The actuating coils of these ten relays are connected in order to terminals 1 through 10 in bank A of switch $S_1$ so that the position of this switch determines the frequency to which the transmitter and receiver is set. The lower contacts of relay 62 and the other nine similar relays are connected in parallel and to the actuating coil of relay 63 for applying a positive voltage thereto upon actuation of any of these relays for reasons which will be apparent later. The transmitter 15 is keyed by the application of a positive potential to keying circuit 65. A relay 64 is provided for blanking the receiver 16 upon actuation of the relay. This may be simply accomplished by short-circuiting a suitable point in the receiver or by applying a high negative bias to one of the tubes in the receiver. The actuating coil of relay 64 is connected to the keying circuit 65 so that the application of a keying voltage to the transmitter renders the receiver inoperative. Relays 66 and 67 are associated with transmitting recorder 20 and receiving recorder 21, respectively, and render these devices operative while the relays are in an energized condition.

In order to communicate with another radio station through the master station shown in Fig. 3 it is necessary to set the coder to produce the identifying code of the station with which communication is desired. In the embodiment shown a two-digit pulse code is employed and the coder is shown as having been set to the code 35 by depressing the first three buttons in contact series 55 and the first five buttons in contact series 56. The frequencies on which the cooperating station is standing by, must also be known and these frequencies must be set into the system by depressing the proper buttons in connection with the contacts of bank B in switch $S_1$. In the embodiment shown, the switch $S_1$ has been set for test transmission on the frequencies $f_3$, $f_4$, $f_5$ and $f_6$. To initiate operation of the master station the starting switch 68 is momentarily depressed to apply a positive voltage to stepping coil 50 of switch $S_1$, thus stepping this switch to the contact 1 position. With the rotating contact of bank B on contact 1, a circuit is made from the pulser 54 through the upper contact of now released switch 68, contact $S_2A1$ (this symbol indicating switch $S_2$, bank A contact 1) and contact $S_1B1$ to the actuating coil 50, so that the next pulse from the pulser steps switch $S_1$ to the contact 2 position. This process continues until the first contact in bank B of switch $S_1$ having an open circuit in series therewith is reached, which, in this case, is contact 3. When contact 3 is reached the circuit to coil 50 is broken and switch $S_1$ rests in this position. The arm of bank A switch $S_1$, now resting on contact 3, applies a positive voltage to the actuating coil of the relay associated with the $f_3$ circuit of frequency selector 17. Actuation of this relay causes the transmitter and receiver to be set to frequency $f_3$ and also provides a voltage to the actuating coil of relay 63 which actuates this relay and applies a positive voltage from contact $S_2C1$ through the upper contact of relay 63 to motor 59, starting rotation of contact 61 in the coder. Soon after this contact begins to revolve, it makes contact with ring 60 which likewise applies a positive voltage to the motor 59 for reasons which will be apparent later. Contact 61, in passing over the first three contacts in series 55, keys the transmitter with three pulses and, in passing over the first five contacts of series 56, keys the transmitter with five pulses, thus transmitting the identifying code of the station with which communication is desired. As the contact passes over strip 57 the transmitter 15 is continuously keyed for about two seconds during which time the cooperating station receives and measures the strength of this signal. When contact 61 reaches contact 58 a positive potential is applied to stepping coil 50 of switch $S_1$ and steps this switch one step. The ring 60 insures that motor 59 continues to run until contact 61 has reached its starting position should the relay 63 open due to the connection at contact $S_1A3$ being broken. The switch $S_1$ is now stepped by pulses from the pulser 54 in the manner previously explained until the next contact having an open circuit in series therewith is reached, which in the embodiment shown is contact $f_4$. When this contact is reached the transmitter and receiver frequencies are set to $f_4$ and the coder again rotates through a complete revolution causing the transmitter to send out the identifying code signal followed by a test transmission as in the case of frequency $f_3$. In a similar manner test transmissions are made on frequencies $f_5$ and $f_6$.

At the conclusion of transmission on frequency $f_6$ the revolving contact 61 of coder 19 makes connection with contact 58 stepping the switch $S_1$ to contact 7. Impulses from pulser 54 then actuate stepping relay 50 of switch $S_1$ until contact 11 is reached. There is now a circuit from the pulser through the upper contact of starting switch 68, contact $S_2A1$ and contact $S_1B11$ to the stepping coil 51 of switch $S_2$ causing this switch to rotate one step. A connection now exists from the pulser through the upper contact of starting switch 68, contact $S_2A2$ and upper contact of relay 69 to stepping coil 50 so that switch $S_1$ begins to rotate at the rate of one step per second. There is also a connection from the output of receiver 16 through contact $S_2B2$ to the actuating coil of relay 69. So long as relay 69 remains unenergized the switch $S_1$ continues to rotate and acts through bank A to consecutively tune the transmitter and receiver to the frequencies of $f_1$ through $f_{10}$ for one second intervals each in recurring cycles. While the receiver is being swept over the various frequencies as described above, the station with which communication is desired is analyzing the test transmissions on the four selected frequencies and will eventually transmit a signal back to the master station on the frequency found to produce the strongest signal, in a manner which will be described later. When this return transmission occurs the receiver 16, in switching over all the frequencies, will eventually become tuned to the return transmission and relay 69 will be energized. This relay is of the delayed actuating type, as indicated by the legend DA, with the delay in this case being sufficient to prevent operation of the relay in response to short transients, such as noise, but to allow operation in the presence of a sustained signal of duration amounting to the substantial part of a second. Actuation of relay 69 causes a positive potential to be applied through the lower contact of this relay to stepping coil 51 rotating switch $S_2$ one step to the contact 3 position. Actuation of relay 69 also blocks the circuit through its upper contact to stepping coil 50 thus causing switch $S_1$ to remain in its last position, and the frequency of transmitter 15 and receiver 16 to be locked on the received frequency through the appropriate contact in bank A of switch $S_1$. It will be assumed for purposes of illustration that the return transmission was on $f_3$ and that switch $S_1$, as a result, remains in its contact 3 position thus locking transmitter 15 and receiver 16 on this frequency.

The output of receiver 16 is now connected through terminal $S_2B3$ to the actuating coil of normally closed relay 70 thus opening the contacts of this relay and preventing the application of a positive potential through contact $S_2C3$ and the lower contact of relay 63 to relay 66 of transmitting recorder 20. The operation of relay 63 should be delayed sufficiently to insure prior actuation of relay 70. So long as the return test transmission from the station with which communication is desired continues, and this period should be of sufficient length to allow at least two rotations of switch $S_1$, the relay 70 remains actuated and transmitting recorder 20 remains deenergized. When the return transmission ceases however, the relay 70 is de-energized and a positive potential is applied to relay 66 to initiate operation of the recorder. The release of relay 70 should be slightly delayed, as indicated by the legend DR, so as to prevent its release by transient fluctuations of short duration in the receiver signal strength. The outgoing traffic from the transmitting recorder is now applied through isolating circuit 71 to the keying circuit 65 of the transmitter.

The recorder will ordinarily be a tape recorder or a similar device for high speed transmission and, in the system shown, it is arranged for a code of three long pulses to follow the end of the recorded matter. The output of the transmitting recorder is applied to relay 72 which is sufficiently delayed to prevent response to the recorded traffic but which operates rapidly enough to respond to the three terminating pulses. The isolating circuit 71 prevents the application of voltages from coder 19 to relay 72. Actuation of relay 72 by the three terminating pulses from the transmitting recorder causes three positive pulses to be applied to stepping coil 51 of switch $S_2$ and this switch to step three more positions. There now exists a connection from the output of receiver 16 through contact $S_2B6$ to the actuating coil of relay 73 and to the input circuit of receiving recorder 21. Also positive potential is applied through contact $S_2C6$ to relay 67 thus initiating operation of the receiving recorder which then records the return traffic from the station with which communication is being had. This transmission is likewise terminated by a code of three long pulses which actuate delayed relay 73 to step switch $S_2$ through three more positions. Positive potential is then applied through contact $S_2C9$ to the actuating coil of relay 74 which, upon actuation, applies positive potential to trip coils 52 and 53 allowing switches $S_1$ and $S_2$ to return to their original starting positions.

A block diagram of a radio station for cooperating with the above described master station has been shown in Fig. 2. Fig. 4*a* shows the circuit details for one channel of the block diagram in Fig. 2. Since all channels are alike except for the frequencies to which they are tuned a description of one of the channels will be sufficient. In Fig. 4*a* the channel shown is assumed to be the one tuned to the frequency $f_3$. The test transmission on frequency $f_3$ is received by receiver 22 and applied through the upper contact of relay 75 and upper contact of relay 76 to stepping coil 77 of stepping switch $S_3$ in the station code selector 26. It will be assumed that the identification code of the station being described is 35 corresponding to the code transmitted by the master station as shown in Fig. 3. The first three pulses of this code upon application to coil 77 rotates switch $S_3$ through three steps. A positive potential is then applied through contact $S_3B3$ to the actuating coil of relay 76. A circuit now exists from the receiver through upper contact of relay 75, lower contact of relay 76, contact $S_3A3$ and the upper contact of relay 78 to stepping coil 79 of stepping switch $S_4$. The next five pulses of the code therefore operates the step switch $S_4$ through five positions. Positive potential is then applied through contact $S_4B5$ to the actuating coil of relay 78 thus closing this relay and providing a direct circuit from the receiver to the actuating coil of relay 80 through the upper contact associated with the lower armature of this relay. This circuit cannot be completed for any code other than 35 for, with the rotating contacts of bank B of switches $S_3$ and $S_4$ resting on any contacts other than 3 and 5 respectively, positive potential is applied to trip coils 81 and 82 thus returning these switches to their starting positions. The action of trip coils 81 and 82 should be delayed sufficiently to prevent action thereof unless a voltage is applied thereto for a period exceeding the normal period between code pulses.

The function of the pulse former 30 is to generate a series of equally spaced pulses proportional in number to the strength of the signal applied thereto. For this purpose a mirror galvanometer 83, a light source 84 and a bank of photoelectric cells 85 connected in parallel to the input of the amplifier 86, are provided. These elements are so arranged that a spot of light from the light source is reflected by the mirror and falls on the photoelectric cells 85. The light source is provided by a normally opened shutter which may be closed by the application of a signal to coil 87. As already explained, the code portion of the test transmission from the master station is followed by continuous test signal of about two seconds duration. This signal actuates relay 80 which is of the delay release type and is adjusted to hold for slightly longer than the duration of the signal, or slightly more than two seconds. The signal is then applied through the lower armature and contact of this relay to the mirror galvanometer 83 and the shutter coil 87. Actuation of relay 80 also causes a positive potential to be applied through the upper armature and contact thereof to the actuating coil of relay 88. Actuation of this relay applies a positive potential through its upper contacts to the light source 84 for energizing this source. The mirror of galvanometer 83 is rotated clockwise through an angle proportional to the strength of the signal applied thereto. During the presence of the signal no light falls on the mirror since the shutter of the light source 84 is held closed through the action of the signal on coil 87. At the end of the test signal coil 87 is de-energized and light from the light source 24 falls on the mirror of the galvanometer 83, which begins to return to its zero position. In returning, a light spot is swept over the photoelectric cells producing one pulse for each cell passed over. The actuation of relay 38 should be slightly delayed to prevent energization of light source 84 before closure of its shutter. Also the release of this relay should be sufficiently delayed to allow time for the galvanometer to return to its zero position.

The signal strength analyzer records the number of pulses produced in each channel by the test transmission and selects the channel having the maximum number of pulses indicating the strongest signal. The manner in which the analyzer accomplishes this will be explained later but, for the present, it is assumed that the transmission on frequency $f_3$ produces the maximum number of pulses and that this frequency has been selected by the analyzer as the optimum frequency. The analyzer then operates to apply a positive potential to the terminal *h* of the transmitter and recorder control 35 in Fig. 4*a* thus energizing the actuating coil of relay 89 and actuating this relay. Positive potential is now applied through the upper contacts of relay 89 to the actuating coil of relay 90. Relay 90 is designed to close upon energization and then to re-open after a fixed period. The period in this case should be sufficient to allow two rotations of switch $S_1$ in Fig. 3, or about 25 seconds minimum. Actuation of relay 90 causes a positive potential to be applied to keying connection 91 of transmitter 41 thus keying the transmitter for 25 seconds or more and producing the previously described return transmission on the optimum frequency to permit the master station to adjust itself to this frequency. A positive potential is also applied through upper contacts of relay 89 to the actuating coil of relay 75 thus connecting the output of receiver 22 through the lower contacts of this relay to the actuating coil of relay 92 and through the lower contacts of relay 89 to the receiving recorder 39 thus placing the recorder in a position to receive the traffic from the master station when the test transmission from transmitter 41 is completed. A connection 93 is provided between the keying connection 91 of transmitter 41 and the actuating coil of relay 94 to blank receiver 22 when transmitter 41 is keyed.

As previously explained, the transmission from the master station ends with a code of three long dashes. The relay 92 which is delayed sufficiently to prevent actuation by the normal traffic responds to these three long pulses to step switch $S_{18}$ through its stepping coil 94 to the contact 3 position. Positive potential is then applied through contact $S_{18}3$ to relay 95 to close this relay and energize transmitting recorder 42. The transmitting recorder is connected through the middle contacts of relay 89 and the isolating circuit 96 to the keying connection 91 of the transmitter which has previously been set to the optimum frequency $f_3$ by the application of a positive potential to the $f_3$ terminal of frequency selector 40 through the upper contacts of relay 89. The transmitter now sends the recorded traffic at the cooperating station to the master station. The signal from the recorder is also applied through the middle contacts of relay 89 to the actuating coil of relay 97. The outgoing traffic, like the received traffic, terminates in a code of three long pulses to which delayed relay 97 responds to step switch $S_{18}$ through three more positions to contact 6. Positive potential is now applied through $S_{18}6$ to trip coil 98, to trip coils 81 and 82 and, through terminal *g*, to all the trip coils in the signal strength analyzer shown in Fig. 4*b*. The action of trip coil 98 should be delayed sufficiently to insure actuation of all other trip coils before it returns switch 18 to its starting position. This action completes one cycle of operation of the cooperating station and the station is now in condition to handle the next transmission initiated by a master station.

The details of the signal strength analyzer 34 of Fig. 2 are shown in Fig. 4*b*. The analyzer comprises a two bank stepping switch for each of the channels in the cooperating station. The analyzer shown is for use with the four channel station shown in Fig. 2 and comprises four stepping switches $S_5$, $S_6$, $S_7$ and $S_8$, one for each of frequencies $f_3$, $f_4$, $f_5$, and $f_6$. It will be assumed that switch $S_5$ in this case is associated with the $f_3$ channel shown in Fig. 4*a*. The output from the amplifier 86 in pulse former 30 of Fig. 4*a* is applied through terminal *e* to the stepping coil 99 of switch $S_5$ and rotates this switch through a number of steps equal to the number of pulses. The terminals *l, m, n, o, p*, and *q* of switches $S_6$, $S_7$ and $S_8$ are connected to the pulse formers, transmitter and recorder controls of the remaining three channels in the same manner that the terminals *e* and *h* are connected to the channel shown in Fig. 4*a*, and each of switches $S_6$, $S_7$ and $S_8$ is stepped through a number of positions depending on the number of pulses received from its associated pulse former. On the first position of any of these switches a connection is made from ground through contacts A1 and B1 to actuating coil of relay 100. Thus the first switch to be rotated one step causes actuation of this relay. Relay 100 starts a timing device 101 having contacts which close after a predetermined time interval, the length of which must be greater than the total time required for switches $S_5$ through $S_8$ to record the pulses from the various channels. At the end of this interval the contacts of timer 101 are closed and initiate action of pulser 102.

The signal strength analyzer also comprises nine additional two bank stepping switches $S_9$ through $S_{17}$, each of which corresponds to a signal strength from the strongest recordable signal (10 pulses) presented by switch $S_9$ to the weakest recordable signal (2 pulses) represented by switch $S_{17}$. Accordingly contacts 2, 3, 4 and 5 of bank A of switch $S_9$ are connected to the B10 contacts of switches $S_5$ through $S_8$ respectively. Similarly contacts 2, 3, 4 and 5 of switch $S_{10}$ are connected to the B9 contacts of switches $S_5$ through $S_8$, respectively, and similarly down the line to switch $S_{17}$ which has contacts 2, 3, 4 and 5 of bank A connected to the B2 contacts of switches $S_5$ through $S_8$ respectively. Terminals 1 through 5 of the B bank of switches $S_9$ through $S_{17}$ are connected together and to their associated stepping coil. The B6 contact in each of switches $S_9$ through $S_{16}$ is connected to the rotating contact in bank B of the next succeeding switch.

The pulser 102 produces equally spaced pulses the frequency of which may be as high as the switch $S_9$ through $S_{17}$ are able to follow. Upon energization of the pulser by the closing of the contact in timer 101 pulses are applied through normally closed contacts of relay 103 and through contact $S_9$B1 to the stepping coil of switch $S_9$. As long as the relay 103 remains closed switch $S_9$ continues to step until contact 6 is reached due to the fact that contacts 1 through 5 are connected together. When contact 6 has been reached pulses are then applied to the revolving contact in bank B of switch $S_{10}$ and upon this switch reaching contact 6 switch $S_{11}$ begins to rotate, and so on until the revolving contact in bank A of one of switches $S_9$ through $S_{17}$ reaches a stationary contact connected to a contact in the B bank of one of switches $S_5$ through $S_8$ with which contact has been made. For example, assume that seven pulses are received from the pulse former in channel $f_3$ so that switch $S_5$ rests on contact 7, and that no more than seven pulses are received from the other channels so that switches $S_6$, $S_7$ and $S_8$ do not rest on any contacts above the seventh. Then when the revolving contact in bank A of switch $S_{12}$ reaches contact 2 in this bank a circuit is completed from a source of positive potential through the actuating coil of relay 103, contact $S_{12}A2$, contact $S_5B7$, contact $S_5A7$, terminal *h* (Fig. 4*a*), and the actuating coil of relay 89 to ground. The resulting energization of relay 103 opens its contacts and prevents further rotation of switch $S_{12}$ from the contact $S_{12}A2$ position. Further, the actuation of relay 89 selects the $f_3$ channel with which switch $S_5$ is associated and initiates operation of this channel to receive and transmit with the master station on the optimum frequency. Had the other switches rested on contacts beyond the seventh then the channel corresponding to the switch which rested on the highest contact would have been selected. For example, had switch $S_7$ rested on the No. 9 contact then when the revolving contact in bank A of switch $S_{10}$ reached stationary contact 2 a circuit would have been completed in the manner described above for channel $f_3$, through the actuating coil of relay 103 and the terminal *o* thus applying a positive potential to the actuating coil of the relay corresponding to relay 89 in the channel associated with switch $S_7$ and this channel would have been selected. It is therefore seen that the A banks of switches $S_9$ through $S_{17}$ correspond to signal strengths and that contacts 2, 3, 4 and 5 in each of these correspond to the four channels of the cooperating radio station, and that by consecutive operation of these switches starting with $S_9$ the channel on which the strongest signal was received is selected. In event two channels demonstrate the same signal strength then the first channel reached by switches $S_9$ through $S_{17}$ having this signal strength is selected. When communication with the master station is completed and switch $S_{18}$ in the transmitter and recorder control of channel $f_3$ (Fig. 4*a*), or the corresponding switch in any of the other channels, has reached the contact 6 position a positive potential is applied through terminal *g* to all trip relays in the signal strength analyzer, thus returning the stepping switches therein to their starting positions as already mentioned.

I claim as my invention:

1. A radio communication system comprising a master station and a cooperating station, means in said master station capable of transmitting and receiving on a plurality of different carrier frequencies, means in said master station cooperating with said transmitting means for effecting consecutive short test transmissions on each of said plurality of carrier frequencies, means in said cooperating station capable of transmitting and receiving on said plurality of different carrier frequencies, means in said cooperating station for analyzing said test transmissions as to signal strength to determine the optimum frequency of said plurality of carrier frequencies for transmission between said stations and for adjusting the transmitting and receiving means of said cooperating station to said optimum frequency, means in said cooperating station for acting on the transmitting means thereof to effect a short return transmission to said master station on said optimum frequency, and means in said master station responsive to said return transmission for adjusting the transmitting and receiving means of the master station to the frequency of said return transmission.

2. A radio communication system for automatically effecting transmission between two stations on the optimum of a plurality of frequencies, said system comprising a master station and a cooperating station, said master station containing a transmitter and a receiver, a frequency selector in said master station for adjusting said transmitter and receiver to any one of a plurality of frequencies, sequence control means in said master station cooperating with said transmitter and frequency selector for effecting consecutive short test transmissions on each of said plurality of frequencies and, at the conclusion of said test transmissions, for adjusting said receiver consecutively to each frequency on which a test transmission was made in repeating cycles, a receiving channel in said cooperating station for each of said test frequencies, transmitting means in said cooperating station capable of being adjusted to any of said plurality of frequencies, analyzing means in said cooperating station for analyzing the test signals from the various receiving channels as to signal strength to determine the optimum frequency of said plurality of frequencies for transmission between said stations, for selecting the receiving channel corresponding to said optimum frequency and for adjusting said transmitting means to said optimum frequency, means in said cooperating station for keying said transmitting means to produce a short return transmission to said master station on said optimum frequency, and means in said master station effective upon reception of said return transmission to lock the receiver and transmitter in said master station to the frequency of said return transmission.

3. Apparatus as claimed in claim 2 in which said sequence control means comprises a stepping switch having two similar banks of contacts, each bank comprising a plurality of stationary contacts and a movable contact, electromagnetic means for moving said movable contacts in unison one step for each electrical pulse applied thereto, a source of electrical pulses, means for applying the pulses from said source to the movable contact of one bank of contacts, means for connecting each of the stationary contacts of said one bank through a circuit interrupting means to said electromagnetic means, and means connecting the movable and stationary contacts of said other bank in circuit with said frequency selector for actuating said frequency selector.

4. Apparatus as claimed in claim 3 in which means including the last stationary contact in said one bank of contacts are provided for operating when connection is made with said last contact during the first cycle of operation of said stepping switch to connect the electrical pulses from said source through a signal actuated switching means to said electromagnetic means to cause repeated cycling of said sequence switch, and for connecting the actuating coil of said signal actuated switching means to the output of said receiver whereby reception of said return transmission interrupts the circuit between said pulses and said electromagnetic means and stops said stepping switch, thus holding said transmitter and receiver on the frequency of the received signal.

5. Apparatus as claimed in claim 2 in which said analyzing means comprises a pulse generating means connected to each of said receiving channels for generating a series of equally spaced electrical pulses proportional in number to the test signal strength in the associated channel, pulse counting means for recording the number of pulses produced by each pulse generating means, and means cooperating with said pulse counting means for adjusting the transmitter in said cooperating station to the frequency of the channel for which the maximum number of pulses was recorded.

6. Apparatus as claimed in claim 5 in which each of said pulse generating means comprises a mirror galvanometer, a series of equally spaced photoelectric cells arranged along the circumference of a circle concentric with the mirror of said galvanometer, a normally blanked light source positioned so that the light therefrom is reflected by said mirror on to said photoelectric cells, means connecting said photoelectric cells in parallel and to an output circuit, means for applying a signal to said galvanometer to deflect same, and means operative at the termination of said signal for unblanking said light source whereby the resulting beam of light passing over said photoelectric cells as the galvanometer returns to its zero position results in a series of pulses in said output circuit proportional in number to the strength of said signal.

7. Apparatus as claimed in claim 6 in which said pulse counting means comprises a pulse counting stepping switch for each of said receiving channels, each of said pulse counting stepping switches having contacts equal in number to the highest possible number of pulses in said series of pulses, and means for connecting the output of the pulse generating means for each channel to the actuating circuit of the corresponding pulse counting stepping switch, and in which said means cooperating with said pulse counting means for adjusting the transmitter in said cooperating station to the frequency of the channel for which the maximum number of pulses was recorded comprises a plurality of additional stepping switches equal in number to one less than the number of contacts on each of said pulse counting stepping switches, each of said additional stepping switches having as many contacts as there are pulse counting stepping switches, means connecting each contact in each additional stepping switch to a contact other than the first in one of said pulse counting stepping switches with the contacts in any one additional switch being connected to corresponding contacts in said pulse counting stepping switches, an additional pulse producing means, means operative upon the application of the first pulse to any of said pulse counting stepping switches to initiate operation of said additional pulse producing means a fixed time interval after the application of said first pulse, means for applying the pulses produced by said additional pulse producing means to the actuating circuits of said additional stepping switches in order beginning with the one associated with the highest numbered contacts of said pulse counting stepping switches and ending with the one associated with the second contacts of said pulse counting stepping switches, means associated with said additional stepping switches for opening the circuit from said additional pulse producing means upon the completion of a circuit through one of said additional stepping switches and one of said pulse counting stepping switches, and means operative upon completion of the above mentioned circuit for adjusting the frequency of the transmitter in said cooperating station to the frequency of the channel with which the pulse counting stepping switch through which the circuit was completed is associated.

JAMES K. DE ARMOND.

REFERENCES CITED

The following references are of record in the file of this patent:

UNITED STATES PATENTS

| Number | Name | Date |
|---|---|---|
| 1,794,393 | Brown et al. | Mar. 3, 1931 |
| 1,913,495 | Matte | June 13, 1933 |
| 2,125,977 | Zworykin | Aug. 9, 1938 |
| 2,260,160 | Benning | Oct. 21, 1941 |
| 2,280,822 | Hansell | Apr. 28, 1942 |
| 2,326,290 | Dickieson | Aug. 10, 1943 |
| 2,363,583 | Gilman | Nov. 28, 1944 |
| 2,425,614 | Goddard | Aug. 12, 1947 |